United States Patent
Loehr et al.

(10) Patent No.: US 12,356,449 B2
(45) Date of Patent: Jul. 8, 2025

(54) LBT PROCEDURE FOR A SET OF PANELS AND/OR BEAMS

(71) Applicant: Lenovo (Singapore) PTE. LTD., New Tech Park (SG)

(72) Inventors: Joachim Loehr, Wiesbaden (DE); Alexander Johann Maria Golitschek Edler von Elbwart, Darmstadt (DE); Ankit Bhamri, Rödermark (DE); Ali Ramadan Ali, Kraiburg am Inn (DE); Karthikeyan Ganesan, Kronberg im Taunus (DE); Prateek Basu Mallick, Dreieich (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 304 days.

(21) Appl. No.: 17/760,234

(22) PCT Filed: Feb. 5, 2021

(86) PCT No.: PCT/IB2021/050964
§ 371 (c)(1),
(2) Date: Aug. 5, 2022

(87) PCT Pub. No.: WO2021/156822
PCT Pub. Date: Aug. 12, 2021

(65) Prior Publication Data
US 2023/0054184 A1 Feb. 23, 2023

Related U.S. Application Data

(60) Provisional application No. 62/970,594, filed on Feb. 5, 2020.

(51) Int. Cl.
*H04W 74/0808* (2024.01)

(52) U.S. Cl.
CPC .............................. *H04W 74/0808* (2013.01)

(58) Field of Classification Search
CPC ..... H04B 7/0695; H04B 7/088; H04W 74/08; H04W 74/0808; H04W 74/0816; H04W 74/0825
See application file for complete search history.

(56) References Cited

U.S. PATENT DOCUMENTS

2019/0103908 A1* 4/2019 Yu ........................ H04B 7/0617
2019/0230706 A1* 7/2019 Li ........................ H04B 7/0695
(Continued)

OTHER PUBLICATIONS

Ericsson, "Handling consistent UL LBT failures", 3GPP TSG-RAN WG2 Meeting #108, Tdoc R2-1915870 (Year: 2019).*
(Continued)

*Primary Examiner* — Ayaz R Sheikh
*Assistant Examiner* — Mang Boi Thawng
(74) *Attorney, Agent, or Firm* — Kunzler Bean & Adamson

(57) ABSTRACT

Apparatuses, methods, and systems are disclosed for handling LBT failure for a set of panels/beams. One apparatus (600) includes a transceiver (625) that includes a plurality of UE panels associated with one or more beams. The apparatus (600) includes a processor (605) that performs (805) a LBT procedure for a configured set of UE Tx panels corresponding to an uplink transmission. The processor (605) declares (810) LBT failure for the uplink transmission in response to determining that the LBT procedure has failed for all UE Tx panels in the configured set and increments (815) a LBT failure counter in response to LBT failure for the uplink transmission.

19 Claims, 8 Drawing Sheets

(56) References Cited

U.S. PATENT DOCUMENTS

| | | | |
|---|---|---|---|
| 2020/0221495 A1* | 7/2020 | Chen | H04W 36/0058 |
| 2020/0252806 A1* | 8/2020 | Yerramalli | H04L 27/0006 |
| 2021/0100031 A1* | 4/2021 | Cirik | H04W 76/19 |
| 2021/0127410 A1* | 4/2021 | Kim | H04L 1/1874 |
| 2021/0203400 A1* | 7/2021 | Babaei | H04W 74/0841 |
| 2021/0337592 A1* | 10/2021 | Kunt | H04W 74/0808 |
| 2022/0022252 A1* | 1/2022 | Lee | H04W 24/08 |
| 2022/0239440 A1* | 7/2022 | Go | H04L 5/0091 |
| 2022/0369139 A1* | 11/2022 | Wang | H04W 74/0808 |
| 2023/0009559 A1* | 1/2023 | Wang | H04B 7/0695 |
| 2024/0090019 A1* | 3/2024 | Chen | H04W 36/0058 |

OTHER PUBLICATIONS

Charter communications, "Remaining Issues on Consistent LBT Failure Detection in NRU", 3GPP TSG-RAN WG2 Meeting #107bis, R2-1913649 (Year: 2019).*

Ericsson, "Handling LBT failures", 3GPP TSG-RAN WG2 #107bis, Tdoc R2-1913504 (Revision of R2-1910779) (Year: 2019).*

LG, "Detection of the consistent uplink LBT failures", 3GPP TSG-RAN WG2 meeting #107, R2-1911196 (Year: 2019).*

LG, "Recovery form the consistent uplink LBT failures", 3GPP TSG-RAN WG2 meeting #107, R2-1911195 (Year: 2019).*

Ericsson, "Handling LBT failures", 3GPP TSG-RAN WG2 #104, TDoc R2-1817969 (Year: 2018).*

InterDigital Inc., "On LBT for Beam-Based Transmission for NR-U", 3GPP TSG RAN WG1 Meeting #92bis, R1-1804885 (Year: 2018).*

Google, "Consistent LBT failure detection and recovery", 3GPP TSG-RAN WG2 Meeting#107, R2-1910688 (Year: 2019).*

MediaTek, "On consistent LBT failures", 3GPP TSG-RAN WG2 Meeting #107bis, R2-1913260 (Year: 2019).*

Qualcomm, "Handling of persistent UL LBT failures", 3GPP TSG-RAN WG2 Meeting #106, R2-1906326 (Year: 2019).*

Ericsson, "Handling UL LBT failures", 3GPP TSG-RAN WG2 #106, Tdoc R2-1907584 (Year: 2019).*

InterDigital, "Handling UL LBT Failures in MAC", 3GPP RAN WG2 Meeting #107bis, R2-1912889 (Year: 2019).*

Interdigital, "Handling UL LBT Failures in MAC", 3GPP RAN WG2 Meeting #106 R2-1906403, May 13-17, 2019, pp. 1-3.

3GPP, 3rd Generation Partnership Project; Technical Specification Group Radio Access Network; NR; Physical layer procedures for data (Release 16), 3GPP TS 38.214 V16.0.0, Dec. 2019, p. 1-147.

3GPP, 3rd Generation Partnership Project; Technical Specification Group Radio Access Network; NR; User Equipment (UE) radio access capabilities (Release 15), 3GPP TS 38.306 V15.8.0, Dec. 2019, p. 1-60.

3GPP, 3rd Generation Partnership Project; Technical Specification Group Radio Access Network; NR; Medium Access Control (MAC) protocol specification (Release 15), 3GPP TS 38.321 V15.8.0, Dec. 2019, p. 1-78.

3GPP, 3rd Generation Partnership Project; Technical Specification Group Radio Access Network; NR; Radio Resource Control (RRC) protocol specification (Release 15), 3GPP TS 38.331 V15.8.0, Dec. 2019, p. 1-532.

PCT/IB2021/050964, Notification of Transmittal of the International Search Report and the Written Opinion of the International Searching Authority, or the Declaration, International Searching Authority, May 25, 2021, pp. 1-11.

* cited by examiner

| Field | Table 500: Fields for AUL-UCI | |
|---|---|---|
| | Bit width | |
| | 1 Transport Block | 2 Transport Blocks |
| AUL C-RNTI | 16 | 16 |
| HARQ Process Number | 4 | 4 |
| Redundancy Version | 2 | 2 |
| New Data Indicator | 1 | 2 |
| PUSCH starting symbol | 1 | 1 |
| PUSCH ending symbol | 1 | 1 |
| Channel Occupancy Time ("COT") sharing indication | 1 | 1 |

FIG. 5

LBT PROCEDURE FOR A SET OF PANELS AND/OR BEAMS

CROSS-REFERENCE TO RELATED APPLICATIONS

This application claims priority to U.S. Provisional Patent Application No. 62/970,594 entitled "Handling Consistent LBT Failure for Spatial LBT" and filed on Feb. 5, 2020 for Joachim Loehr, Alexander Golitschek Edler von Elbwart, Ankit Bhamri, Ali Ali, Karthikeyan Ganesan, and Prateek Basu Mallick, which application is incorporated herein by reference.

FIELD

The subject matter disclosed herein relates generally to wireless communications and more particularly relates to handling consistent Listen-Before-Talk ("LBT") failure for the case of spatial multiplexed communications.

BACKGROUND

The following abbreviations are herewith defined, at least some of which are referred to within the following description: Third Generation Partnership Project ("3GPP"), 5th Generation ("5G"), 5G Access Network ("5G-AN"), 5G Core Network ("5GC" or "5C-CN"), 5G System ("5GS"), Positive-Acknowledgment ("ACK"), Application Function ("AF"), Access and Mobility Management Function ("AMF"), Application Programming Interface ("API"), Access Stratum ("AS"), Autonomous Uplink ("AUL"), Authentication Server Function ("AUSF"), Base Station ("BS"), Bandwidth ("BW"), Bandwidth Part ("BWP"), Clear Channel Assessment ("CCA"), Code Division Multiple Access ("CDMA"), Control Element ("CE"), Configured Grant ("CG", a semi-persistent grant of radio resources), Core Network ("CN"), Channel Occupancy ("CO"), Channel Occupancy Time ("COT"), Configured Scheduling Radio Network Temporary Identifier ("CS-RNTI"), Channel State Information ("CSI"), CSI Reference Signal ("CSI-RS"), CSI-RS Resource Index ("CRI"), Contention Window Size ("CWS"), Downlink Control Information ("DCI"), Downlink ("DL"), Data Radio Bearer ("DRB"), Discontinuous Transmission ("DTX"), Enhanced Clear Channel Assessment ("eCCA"), Evolved Node B ("eNB"), Evolved Packet Core Network ("EPC"), Evolved Packet System ("EPS"), 5G/NR Node B ("gNB"), General Packet Radio Service ("GPRS"), Global System for Mobile Communications ("GSM", i.e., a 2G digital cellular network), Hybrid Automatic Repeat Request ("HARQ"), Home Subscriber Server ("HSS"), Identity ("ID"), Internet Protocol ("IP"), Layer-1 ("L1", also known as the Physical Layer), Layer 1 Identifier ("L1 ID"), Layer-2 ("L2", also known as the Link Layer), Layer 2 Identifier ("L2 ID"), Layer-3 ("L3", also known as the Network Layer), Listen-Before-Talk ("LBT"), Long Term Evolution ("LTE"), Medium Access Control ("MAC"), Medium Access Control Element ("MAC CE"), Master Cell Group ("MSG"), Mobility Management Entity ("MME"), Negative-Acknowledgment ("NACK") or ("NAK"), Non Access Stratum ("NAS"), Network Exposure Function ("NEF"), Network Function ("NF," e.g., a network entity performing a well-defined function, such as AMF, SMF. PCF. UDM, etc.), New Radio ("NR"), NR in Unlicensed Spectrum ("NR-U"), Network Slice Selection Assistance Information ("NSSAI", e.g., a vector value including one or more S-NSSAI values), Primary Cell ("PCell"), Policy Control Function ("PCF"), Physical Downlink Control Channel ("PDCCH"), Physical Downlink Shared Channel ("PDSCH"), Packet Data Unit ("PDU"), Physical Layer ("PHY"), Public Land Mobile Network ("PLMN"), Physical Random Access Channel ("PRACH"), Primary Secondary Cell ("PSCell," i.e., the SpCell of a SCG), Physical Uplink Control Channel ("PUCCH"), Physical Uplink Shared Channel ("PUSCH"), Quality of Service ("QoS"), Quasi-Co-Location ("QCL"). Random Access Procedure ("RACH"), Radio Access Network ("RAN"), Radio Access Technology ("RAT"), Radio Link Failure ("RLF"), Radio Network Temporary Identifier ("RNTI"), Radio Resource Control ("RRC"), Reference Signal ("RS", e.g., CSI RS), Receive ("RX"), Secondary Cell ("SCell"), Secondary Cell Group ("SCG"), Shared Channel ("SCH"), Space Division Multiplexing ("SDM"), Signal-to-Interference-Plus-Noise Ratio ("SINR"), Session Management Function ("SMF"), Single Network Slice Selection Assistance Information ("S-NSSAI"), Special Cell ("SpCell," e.g., either referring to the PCell of the MCG or the PSCell of the SCG), SRS Resource Indicator ("SRI"), Sounding Reference Signal ("SRS"), Synchronization Signal ("SS"), Synchronization Signal/Physical Broadcast Channel ("SS/PBCH"), Synchronization Signal Block ("SSB"), SS/PBCH Block Resource Index ("SSBRI"), Transport Block ("TB"), Transmission Configuration Indicator ("TCI"), Time Division Multiplex ("TDM"), Transmit ("Tx"), Uplink Control Information ("UCI"), Unified Data Management ("UDM"), Unified Data Repository ("UDR"). User Entity/Equipment (Mobile Terminal) ("UE", e.g., containing mobile equipment "ME", subscriber identity and/or identification module "SIM"), Uplink ("UL"), Uplink Shared Channel ("UL-SCH"), Universal Mobile Telecommunications System ("UMTS"), User Plane Function ("UPF"), and Worldwide Interoperability for Microwave Access ("WiMAX"). As used herein, "HARQ-ACK" may represent collectively the Positive Acknowledge ("ACK") and the Negative Acknowledge ("NACK") and Discontinuous Transmission ("DTX"). ACK means that a TB is correctly received while NACK (or NAK) means a TB is erroneously received and DTX means that no TB was detected.

In certain wireless communication systems, service is supplemented by operation on unlicensed spectrum. However, operation on unlicensed spectrum requires Clear Channel Assessment ("CCA") prior to transmission, for example involving a Listen-Before-Talk ("LBT") procedure.

In NR-U, channel access relies on the LBT procedure in both the downlink and the uplink. A gNB and/or UE must first sense the channel to find out there is no on-going communications prior to any transmission. However, no beamforming is considered for LBT in NR-U in Rel-16 and only omni-directional LBT is assumed.

BRIEF SUMMARY

Disclosed are procedures for handling LBT failure for a set of panels/beams. Said procedures may be implemented by apparatus, systems, methods, or computer program products.

One method of a UE includes performing a LBT procedure for a configured set of Tx beams corresponding to an uplink transmission. The method includes declaring LBT failure for the uplink transmission in response to determining that the LBT procedure has failed for all Tx beams in the configured set. The method includes incrementing a LBT failure counter in response to LBT failure for the uplink transmission.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 5 is a diagram illustrating one embodiment of an indication of channel occupancy time sharing;

DETAILED DESCRIPTION

Figure 1:
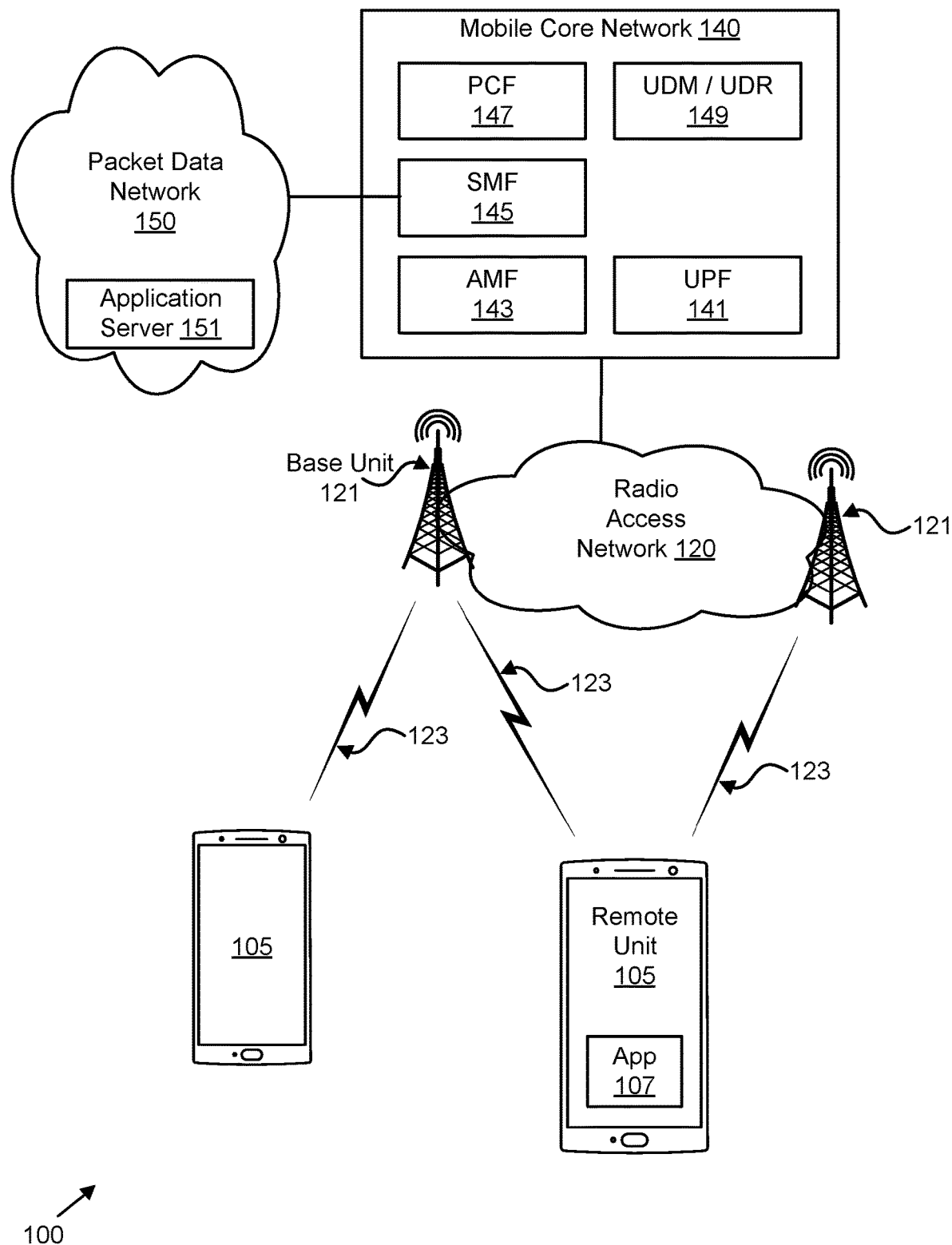
FIG. 1 is a schematic block diagram illustrating one embodiment of a wireless communication system for handling LBT failure for a set of panels/beams.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment." or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising." "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for handling spatial LBT failure. A MAC layer entity of the UE relies on reception of a notification of UL LBT failure from the Physical layer to detect a consistent UL LBT failure. Upon declaration of consistent LBT failure on PCell or PSCell for an active UL BWP, the UE may switch to another UL BWP and initiates a RACH procedure (e.g., assuming the UE is configured with another UL BWP having configured RACH resources.

In certain embodiments, the UE performs RLF recovery if the consistent UL LBT failure was detected on the PCell and UL LBT failure was detected on "N" possible BWP. When consistent uplink LBT failures are detected on the PSCell, the UE informs MN via the SCG failure information procedure after detecting a consistent UL LBT failure on "N" BWPs. Here, "N" represents the number of configured BWPs with configured PRACH resources. If N is larger than one, then it is up to the UE implementation which BWP the UE selects.

When consistent uplink LBT failures are detected on an SCell, a new MAC CE to report this to the node where SCell belongs to is used. FFS whether the MAC CE can be used to report failure on PCell. In case of consistent LBT failure, the UE may be allowed to autonomously switch the UL BWP. No beamforming is considered for LBT in NR-U in Rel-16 and only omni-directional LBT is assumed.

NR-U LBT procedures for channel access can be summarized as follows: 1) Both gNB-initiated and UE-initiated COTs use category 4 LBT where the start of a new transmission burst always perform LBT with exponential backoff. Only with exception, when the DRS must be at most one ms in duration and is not multiplexed with unicast PDSCH: 2) UL transmission within a gNB-initiated COT or a subsequent DL transmission within a UE- or gNB-initiated COT can transmit immediately without sensing only if the gap from the end of the previous transmission is not more than 16 μs, otherwise category 2 LBT must be used and the gap cannot exceed 25 μs.

In various embodiments, a UE may include multiple antenna panels. An identifier (ID) that can be used at least for indicating panel-specific UL transmission is supported. The ID may be defined considering the possibility to reuse/modification of Rel-15 specification support or introducing new ID. In certain embodiments, the UE is not required to explicitly disclose its UL antenna panel implementation. In other embodiments, UE capability signaling may be used for panel-specific UL transmission.

A panel identifier (panel ID) to be used at least for indicating panel-specific UL transmission may include one of the following: 1) an SRS resource set ID, where FFS on further association to other RS (if needed): 2) an ID, which is directly associated to a reference RS resource and/or resource set: 3) an ID, which can be assigned for a target RS resource or resource set; and 4) an ID which is additionally configured in spatial relation information. The panel ID (not excluding to reuse existing ID) may be used for panel-selection-based transmission of PUSCH, PUCCH and SRS, among multiple activated panels.

In some embodiments, multiple panels are implemented on a UE and only one panel can be activated at a time, with a predetermined panel switching/activation delay. In some embodiments, multiple panels are implemented on a UE and multiple panels can be activated at a time and one or more panels can be used for transmission. In some embodiments, multiple panels are implemented on a UE and multiple panels can be activated at a time but only one panel can be used for transmission. Note that this does not require a UE to always activate multi-panels simultaneously. Also note that the UE can control the panel activation/deactivation.

In other embodiments, a new panel-ID may be used, which can be implicitly/explicitly applied to the transmission for a target RS resource or resource set, for PUCCH resource, for SRS resource. In such embodiments, a panel specific signaling is performed using the new panel-ID implicitly (e.g., by DL beam reporting enhancement) or explicitly. If explicitly signaled, the ID can be configured in the target RS/channel or reference RS (e.g., in the DL RS resource configuration or in spatial relation info).

Regarding beam management, in some embodiments the UE is to report CRI/SSBRI where the CRI/SSBRI refers to a preferred spatial relation RS for UL transmission. In some embodiments, an SRI field in the DCI can be used to indicate multiple SRS resources and the UE's autonomous selection of one SRS resource for PUSCH beam determination out of the multiple. In other embodiments, beam specific PHR reporting is used to determine beam-specific MPE impact transparently, i.e., by difference value between Pcmax (i.e., the configured maximum UE output power, which value is calculated based on P-MPR) and the required transmission power. Note that according to current 3GPP TS 38.214 section 6.2.1, only a single SRS resource within an SRS resource set can be transmitted at a given time instant, when the given SRS resource set is configured to be applicable for beam management.

As used herein, a "UE panel" refers to a logical entity that may be mapped to physical UE antennas. For certain condition(s), the gNB can assume the mapping between the UE's physical antennas to the logical entity "UE panel" activated for transmission will not be changed. Depending on the UE's own implementation, a "UE panel" can have at least the following functionality as an operational role of Unit of antenna group to control its Tx beam independently.

For a UE initiated channel occupancy ("CO") the reference duration for Contention Window Size ("CWS") adjustment is defined as follows.

For a CO with PUSCH(s) and for each set of LBT bandwidths for which a single contention window is maintained, the reference duration for CWS adjustment is from the beginning of the CO until the end of the first slot where at least one PUSCH is transmitted over all the resources allocated for the PUSCH, or until the end of the first transmission burst by the UE that contains PUSCH(s) transmitted over all the resources allocated for the PUSCH, whichever occurs earlier.

If the CO has a PUSCH, but does not have any PUSCH transmitted over all the resources allocated for that PUSCH, then, the duration of the first transmission burst by the UE within the CO that contains PUSCH(s) is the reference duration for CWS adjustment.

A first problem addressed by the present disclosure relates to how to determine consistent LBT failure in the presence of multi-panel operation with spatial LBT. Spatial LBT and multi-panel transmission has not been so far considered for the definition of a consistent LBT failure in NR-U. In Rel-16 it is assumed that the UE is performing only omni-directional LBT. The disclosure provides several embodiments aiming at defining the event of a consistent LBT failure and corresponding UE behavior such that the benefit of performing CCA/LBT procedures on multiple panels/beam (in parallel) is exploited. Also, the disclosure presents solutions for an efficient management of the set of panels/beams being active in the UE for transmission and/or reception.

A second problem addressed by the present disclosure relates to UE-initiated COT-sharing in the presence of spatial LBT. For the case of a UE-initiated COT-sharing, the gNB is not aware of the spatial characteristics (spatial filter) used by the UE for the LBT procedure, i.e., the gNB does not know for which Rx panel/beam the UE was performing CCA/LBT for the acquired COT. Therefore, the gNB may perform the subsequent DL transmission(s) within the shared COT for a completely different spatial direction which may lead to an increased collision.

FIG. 1 depicts a wireless communication system 100 for handling LBT failure for a set of panels/beams, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 140.

In some embodiments, the remote units 105 communicate with an application server 151 (or other communication peer) via a network connection with the mobile core network 140. For example, an application 107 in a remote unit 105 (e.g., web browser, media client, telephone/VoIP application) may trigger the remote unit 105 to establish a PDU session (or other data connection) with the mobile core network 140 using the RAN 120 (e.g., a 3GPP access network and/or non-3GPP access network). The mobile core network 140 then relays traffic between the remote unit 105 and the data network 150 (e.g., application server 151) using the PDU session. The PDU session represents a logical connection between the remote unit 105 and the UPF 141. In order to establish the PDU session, the remote unit 105 must be registered with the mobile core network. Note that the remote unit 105 may establish one or more PDU sessions (or other data connections) with the mobile core network 140. As such, the remote unit 105 may have at least one PDU session for communicating with the data network 150. The remote unit 105 may establish additional PDU sessions for communicating with other data networks and/or other communication peers.

The base units 121 may be distributed over a geographic region. In certain embodiments, a base unit 121 may also be referred to as an access terminal, an access point, a base, a base station, a Node-B, an eNB, a gNB, a Home Node-B, a relay node, a RAN node, or by any other terminology used in the art. The base units 121 are generally part of a radio access network ("RAN"), such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121.

In one embodiment, the mobile core network 140 is a 5G core ("5GC") or the evolved packet core ("EPC"), which may be coupled to a packet data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes one or more user plane functions ("UPFs") 141. The mobile core network 140 also includes multiple control plane functions including, but not limited to, an Access and Mobility Management Function ("AMF") 143 that serves the RAN 120, a Session Management Function ("SMF") 145, a Policy Control Function ("PCF") 147, and a Unified Data Management function ("UDM") 149. In various embodiments, the mobile core network 140 may also include an Authentication Server Function ("AUSF"), a Network Repository Function ("NRF") (used by the various NFs to discover and communicate with each other over APIs), a Network Exposure Function ("NEF"), or other NFs defined for the 5GC.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. Each network slice includes a set of CP and/or UP network functions. A network instance may be identified by a S-NSSAI, while a set of network slices for which the remote unit 105 is authorized to use is identified by NSSAI. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an MME, S-GW, P-GW, HSS, and the like. In certain embodiments, the mobile core network 140 may include a AAA server.

In particular, the remote unit 105 may detect LBT failure for at least one panel/beam corresponding to an uplink transmission and track LBT failure for all panels and beams supported by the remote unit 105 (e.g., for all active/configured panels/beams). When a predefined maximum number of LBT failure indications have been received, the remote unit 105 may autonomously deactivate a certain panel/beam.

In some embodiments, deactivating the panel/beam includes ignoring information in a DCI or UL grant that is specific to the deactivated beam. In some embodiments, deactivating the panel/beam includes selecting a different panel/beam for LBT and/or corresponding uplink transmission. In such embodiments, the remote unit 105 activates the selected panel/beam and may initiate RACH procedure for the newly activated panel/beam. In various embodiments, the deactivated panel/beam and the selected panel/beam belong to a set of active/configured panels/beams.

While FIG. 1 depicts components of a 5G RAN and a 5G core network, the described embodiments for handling LBT failure for a set of panels/beams apply to other types of communication networks and RATs, including IEEE 802.11 variants, GSM, GPRS, UMTS, LTE variants, CDMA 2000, Bluetooth, ZigBee, Sigfoxx, and the like. For example, in an LTE variant involving an EPC, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In the following descriptions, the term "RAN Node" is used for the base station but it is replaceable by any other radio access node, e.g., gNB, eNB, BS, AP, NR, etc. Further the operations are described mainly in the context of 5G NR. However, the proposed solutions/methods are also equally applicable to other mobile communication systems supporting spatially multiplexed communication.

In the various embodiments, an antenna port is defined such that the channel over which a symbol on the antenna port is conveyed can be inferred from the channel over which another symbol on the same antenna port is conveyed. One or more antenna ports are used for UL transmissions.

Two antenna ports are said to be quasi co-located ("QCL") if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters. Two antenna ports may be quasi-located with respect to a subset of the large-scale properties. Spatial Rx parameters may include one or more of: angle of arrival ("AoA"), Dominant AoA, average AoA, angular spread, Power Angular Spectrum ("PAS") of AoA, average angle of departure ("AoD"), PAS of AoD, transmit/receive channel correlation, transmit/receive beamforming, spatial channel correlation etc.

An "antenna port" according to an embodiment may be a logical port that may correspond to a beam (resulting from beamforming) or may correspond to a physical antenna on a device. In some embodiments, a physical antenna may map directly to a single antenna port, in which an antenna port corresponds to an actual physical antenna. Alternately, a set or subset of physical antennas, or antenna set or antenna array or antenna sub-array, may be mapped to one or more antenna ports after applying complex weights, a cyclic delay, or both to the signal on each physical antenna. The physical antenna set may have antennas from a single module or panel or from multiple modules or panels. The weights may be fixed as in an antenna virtualization scheme, such as cyclic delay diversity ("CDD"). The procedure used to derive antenna ports from physical antennas may be specific to a device implementation and transparent to other devices.

Throughout the different embodiments of the disclosure, the term quasi co-location—and quasi co-located—is to be understood mainly in the terms of transmit/receive beamforming respectively spatial channel correlation but should not be limited thereto.

According to a first solution, LBT failure is declared for an UL transmission in case LBT fails for all panels/beams on which LBT was performed for the corresponding UL transmission, i.e., LBT failure is indicated per UL transmission. Here, it is assumed that a remote unit 105 performs LBT on a set of panels and/or beams, e.g., the set of panels/beams may be indicated/configured by the base unit 121) for a corresponding UL transmission.

According to a second solution, the remote unit 105 counts LBT failure (e.g., LBT failure indication as indicated by physical layer) on a per-panel/beam bases and deactivates a certain panel/beam when a predefined maximum number of LBT failure indications have been received. The remote unit 105 declares consistent LBT failure for an UL BWP if—for all of the active panels/beams—the predefined maximum number of LBT failures has been met (or exceeded).

According to a third solution, the Rx panel/beam used by a remote unit 105 for the LBT procedure may be different from the Rx panel/beam used for DL data/control reception. In one implementation of this solution, the Rx panel/beam used for LBT procedure is determined by the Tx panel/beam information associated with the corresponding UL transmission for which LBT procedure is performed. For example, the remote unit 105 uses the panel/beam information carried in a DCI (UL grant), e.g., SRI, for setting the Rx panel/beam for the corresponding LBT procedure/CCA. In other words, the RX Panel/beam used for CCA/LBT and the Tx panel/beam used for corresponding UL transmission is to have the same spatial characteristics.

According to a fourth solution, the remote unit 105 is allowed to autonomously change the Tx panel/beam (or spatial filter) for a configured grant PUSCH. For this solution it is assumed that for a Configured Grant type-2 the activation PDCCH carries Tx panel/beam information, e.g., SRI. In case of a Configured Grant type-1 the Tx panel/beam to be used for the CG PUSCH transmission is configured by higher layer signaling, e.g., RRC signaling. Since the validity period of a configured grant could be quite long, it may be necessary to update the spatial filter (Tx panel/beam) for the CG PUSCH transmissions, e.g., due to remote unit's mobility.

According to a fifth solution, the remote unit 105 applies SRI information received within a dynamic UL grant not only for the corresponding dynamic PUSCH transmission but also for subsequent configured grant PUSCH transmission(s) configured for the same cell. According to this solution, the base unit 121 is able to update/steer Tx panels/beams for all subsequent scheduled UL transmissions, e.g., on PUSCH, by means of a single DCI.

According to a sixth solution, whenever the remote unit 105 is sharing its COT with the base unit 121 (or other nodes), e.g., when the remote unit 105 indicates within the AUL-UCI or CG-UCI the COT sharing information, the remote unit 105 signals information on the spatial filter (Rx panel/beam) used for the CCA/LBT procedure. Such information can be used by the base unit 121 for subsequent DL transmissions within the shared COT. Here, it is assumed that the base unit 121 performs an DL transmission with the same spatial characteristics, e.g., same/similar spatial filter, as the ones used for performing LBT on a Rx panel/beam. Essentially, it should be avoided that the remote unit 105 performs LBT for a specific spatial direction and then the base unit 121 performs DL transmission(s) within the COT acquired by the remote unit 105 in an opposite spatial direction.

In one exemplary implementation of the sixth solution, the remote unit 105 signals its Rx panel/beam information to the base unit 121 within the CG/AUL-UCI. Such information may be comprised of TCI state information.

According to a seventh solution, the remote unit 105 is not allowed to switch the Tx panel/beam during a COT. The remote unit 105 is to use the same spatial filter for the UL transmission during a COT as used for the CCA/LBT procedure. In case the remote unit 105 changes its UL panel/beam during a COT, the remote unit 105 is to perform CCA/LBT before transmitting on the uplink with a different UL Tx panel/beam.

Figure 2:
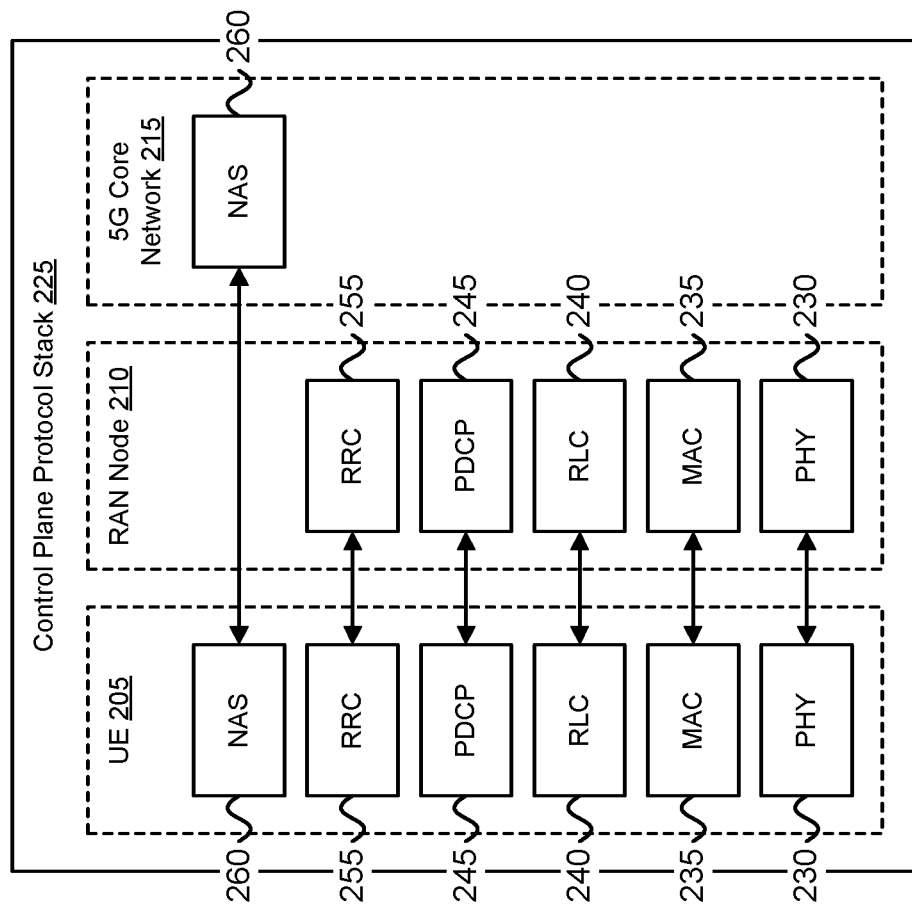
FIG. 2 is a block diagram illustrating one embodiment of a NR protocol stack.
Figure 2:
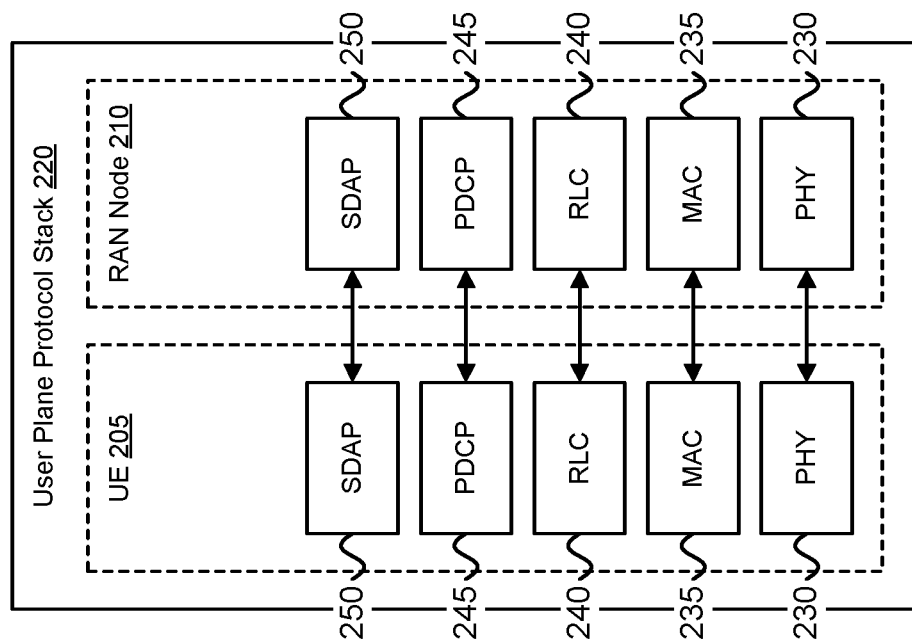

FIG. 2 depicts a NR protocol stack 200, according to embodiments of the disclosure. While FIG. 2 shows a UE 205, a RAN node 210 and a 5G core network ("5GC") 215, these are representative of a set of remote units 105 interacting with a base unit 121 and a mobile core network 140. As depicted, the protocol stack 200 comprises a User Plane protocol stack 220 and a Control Plane protocol stack 225. The User Plane protocol stack 220 includes a physical ("PHY") layer 230, a Medium Access Control ("MAC") sublayer 235, the Radio Link Control ("RLC") sublayer 240, a Packet Data Convergence Protocol ("PDCP") sublayer 245, and Service Data Adaptation Protocol ("SDAP") layer 250. The Control Plane protocol stack 225 includes a physical layer 230, a MAC sublayer 235, a RLC sublayer 240, and a PDCP sublayer 245. The Control Place protocol stack 225 also includes a Radio Resource Control ("RRC") layer 255 and a Non-Access Stratum ("NAS") layer 260.

The AS layer (also referred to as "AS protocol stack") for the User Plane protocol stack 220 consists of at least SDAP, PDCP, RLC and MAC sublayers, and the physical layer. The AS layer for the Control Plane protocol stack 225 consists of at least RRC, PDCP, RLC and MAC sublayers, and the physical layer. The Layer-2 ("L2") is split into the SDAP, PDCP, RLC and MAC sublayers. The Layer-3 ("L3") includes the RRC sublayer 255 and the NAS layer 260 for the control plane and includes, e.g., an Internet Protocol ("IP") layer or PDU Layer (note depicted) for the user plane. L1 and L2 are referred to as "lower layers," while L3 and above (e.g., transport layer, application layer) are referred to as "higher layers" or "upper layers."

The physical layer 230 offers transport channels to the MAC sublayer 235. The MAC sublayer 235 offers logical channels to the RLC sublayer 240. The RLC sublayer 240 offers RLC channels to the PDCP sublayer 245. The PDCP sublayer 245 offers radio bearers to the SDAP sublayer 250 and/or RRC layer 255. The SDAP sublayer 250 offers QoS flows to the core network (e.g., 5GC 215). The RRC layer 255 provides for the addition, modification, and release of Carrier Aggregation and/or Dual Connectivity. The RRC layer 255 also manages the establishment, configuration, maintenance, and release of Signaling Radio Bearers ("SRBs") and Data Radio Bearers ("DRBs"). The NAS layer 260 is used to convey non-radio signaling between the UE 205 and, e.g., an AMF in the 5GC 215 (or a MME for an LTE/EPS scenario).

Figure 3:
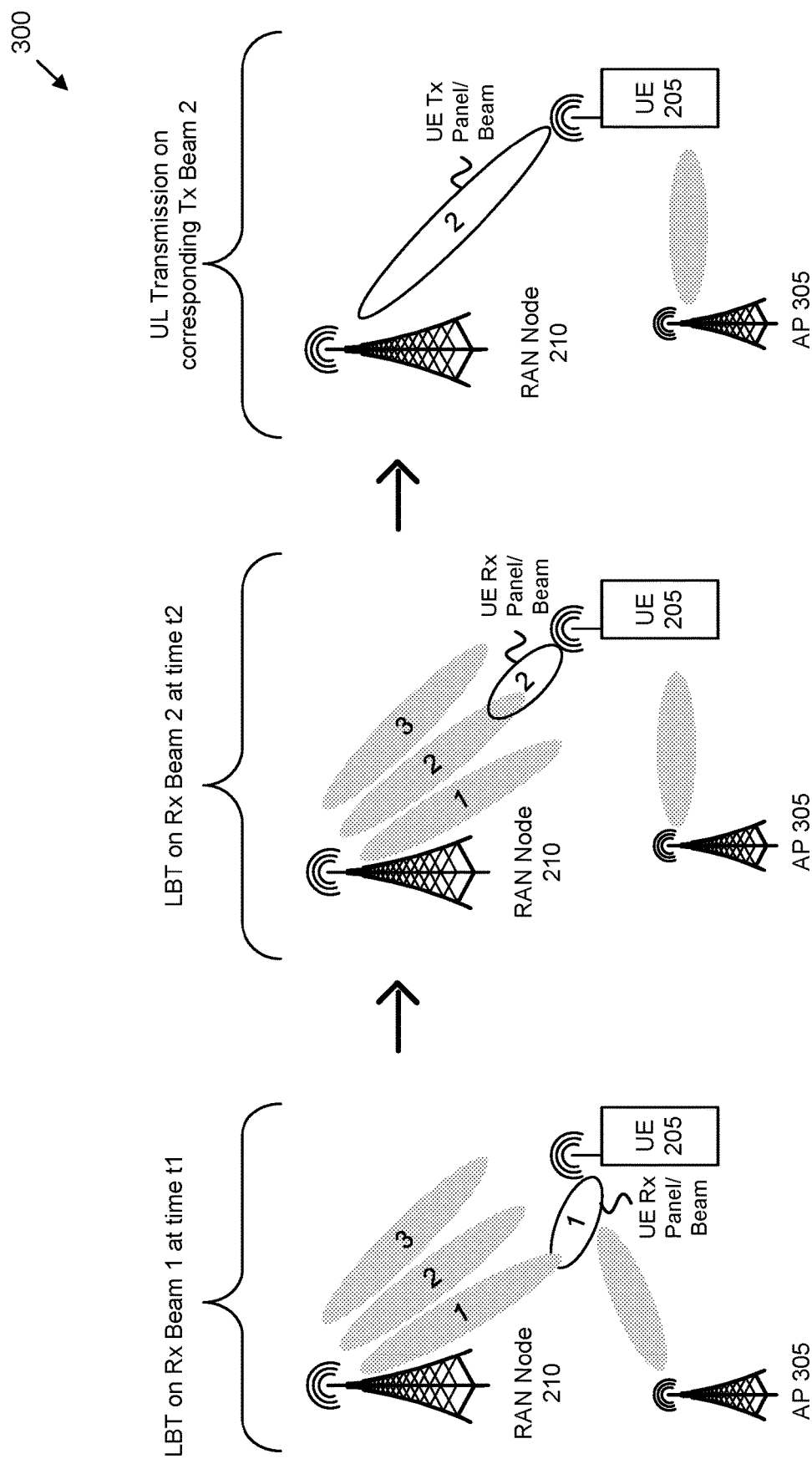
FIG. 3 is a diagram illustrating one embodiment of handling spatial LBT failure.

FIG. 3 depicts a scenario 300 for handling spatial LBT failure, according to embodiments of the disclosure. The scenario 300 may involve a UE 205, a RAN node 210 with which the UE 205 desires to send a UL transmission, and an access point ("AP") 305 which is a potential user of the same communication frequencies as the UE 205 and RAN node 210. The UE 205 may be one implementation of the remote unit 105 and the RAN node 210 may be one implementation of the base unit 121. The UE 205 has generated a UL TB for transmission to the RAN node 210 and thus performs performing a LBT procedure for a configured set of Tx panels/beams corresponding to the UL transmission.

At time 't1,' the UE 205 performs LBT on a first Rx panel/beam. Note that the LBT procedure determines whether the RAN node 210, the AP 305, or another device is using the channel (i.e., radio frequencies) that the UE 205 is to use for the UL transmission. Here, it is assumed that LBT fails for Rx panel/beam #1. At time 't2,' the UE 205 performs LBT on a second Rx panel/beam. Here, it is assumed that LBT is successful for the Rx panel/beam #2. Thus, the UE 205 performs UL transmission on the corresponding Tx panel/beam #2. However, if LBT fails for Rx panel/beam #2, then the UE 205 continues performing a LBT procedure for the configured set of Tx panels/beams until LBT success or until LBT fails for all configured panels/beams.

According to the first solution, the UE 205 declares LBT failure for an UL transmission for the case where LBT fails for all panels/beams on which LBT was performed for the corresponding UL transmission, i.e., LBT failure is indicated per UL transmission. It is assumed that the UE 205 performs LBT on a set of panels and/or beams for a corresponding UL transmission. In various embodiments, the set of panels/beams may be indicated/configured by the RAN node 210. The LBT procedure may be performed in parallel for a configured set of panels/beams or, alternatively, in a TDM fashion as depicted in FIG. 3. If LBT is not successful using any of the configured panels and/or beams, then the UE 205 considers the LBT for the corresponding uplink transmission as failed. Note here that LBT failure is determined on a per-transmission basis.

When the lower layer entity performs multiple LBT procedures before a UL transmission and the transmission is not performed, an LBT failure indication is sent to the MAC entity from lower layers. As a consequence, the LBT failure counter, e.g., LBT_COUNTER, is increased by one. It should be noted that even for cases when the UE 205 is, for example, performing LBT on two different Rx panels/beams and LBT was only successful for one of the two panels/beams, the counter is not increased for the failed LBT, i.e., LBT_COUNTER is not counted per panel/beam.

According to one implementation of the first solution, the UE 205 measures (and tracks) LBT failure per panel/beam different than the counter LBT_COUNTER. The UE 205 may further report the LBT failure statistics, e.g., LBT failure per panel/beam, to the RAN node 210 which may use this information for future scheduling/UL beam management. Counting LBT failures per panel/beam may be done in addition to the per-transmission LBT failure handling as explained above.

As such, the UE 205 may have one counter, e.g., LBT_COUNTER, used for declaring consistent LBT failure, said counter being incremented by one when all LBT attempts fail for an UL transmission, and then have an additional (supplemental) counter for some or each active panel/beam. Here, the supplemental counter(s) may be used for generating some statistics about LBT failure per panel/beam. In a variant, a subset of LBT statistics that are obtained per panel/beam is reported to the RAN node 210. For example, the UE 205 may report only panel/beam LBT statistics for which the LBT failure exceeds a certain (e.g., pre-defined) threshold), e.g., to reduce the overhead of the report.

According to another implementation of the first solution, the UE 205 counts and/or reports LBT failure per group of panels and/or beams that have the same QCL relationship. In such embodiments, a group LBT failure counter is incremented per panel and/or beam group only when all panels and/or beams belonging to the same QCL group fails.

According to the second solution, the UE 205 tracks LBT failure, e.g., LBT failure indication as indicated by physical layer, on a per panel/beam basis and autonomously deactivates (e.g., UE-initiated) a certain panel/beam when a pre-defined maximum number of LBT failure indications have been received for that panel/beam. According to the second solution, the UE 205 declares consistent LBT failure for an UL BWP if the predefined maximum number of LBT failures has been exceeded/met for all of the active panels/beams. For the case that the maximum number of LBT failures, e.g., lbt-FailureInstanceMaxCount, has been met/exceeded for one panel/beam, the UE 205 may autonomously deactivate the panel/beam, i.e., the UE 205 will not perform any further LBT procedure on this panel/beam. In some embodiments, the UE 205 may inform RAN node 210 when deactivating a panel/beam, e.g., by signaling a MAC CE or any other signaling.

When LBT has failed some preconfigured number of times for a specific panel/beam the UE 205 is allowed to autonomously deactivate this panel/beam. This may imply that the UE 205 ignores the beam specific information signaled in a DCI/UL grant and selects a different panel/beam for LBT and/or corresponding UL transmission, e.g., from the set of active/configured panels/beams. According to one implementation the UE 205 may also autonomously activate another panel/beam upon (autonomous) deactivation of a panel/beam, and perform the Random Access Procedure for the newly activated panel/beam. Alternatively, the UE 205 may inform the network (e.g., the RAN node 210) about the newly activated panel/beam, e.g., by signaling a MAC CE or any other signaling.

Figure 4:
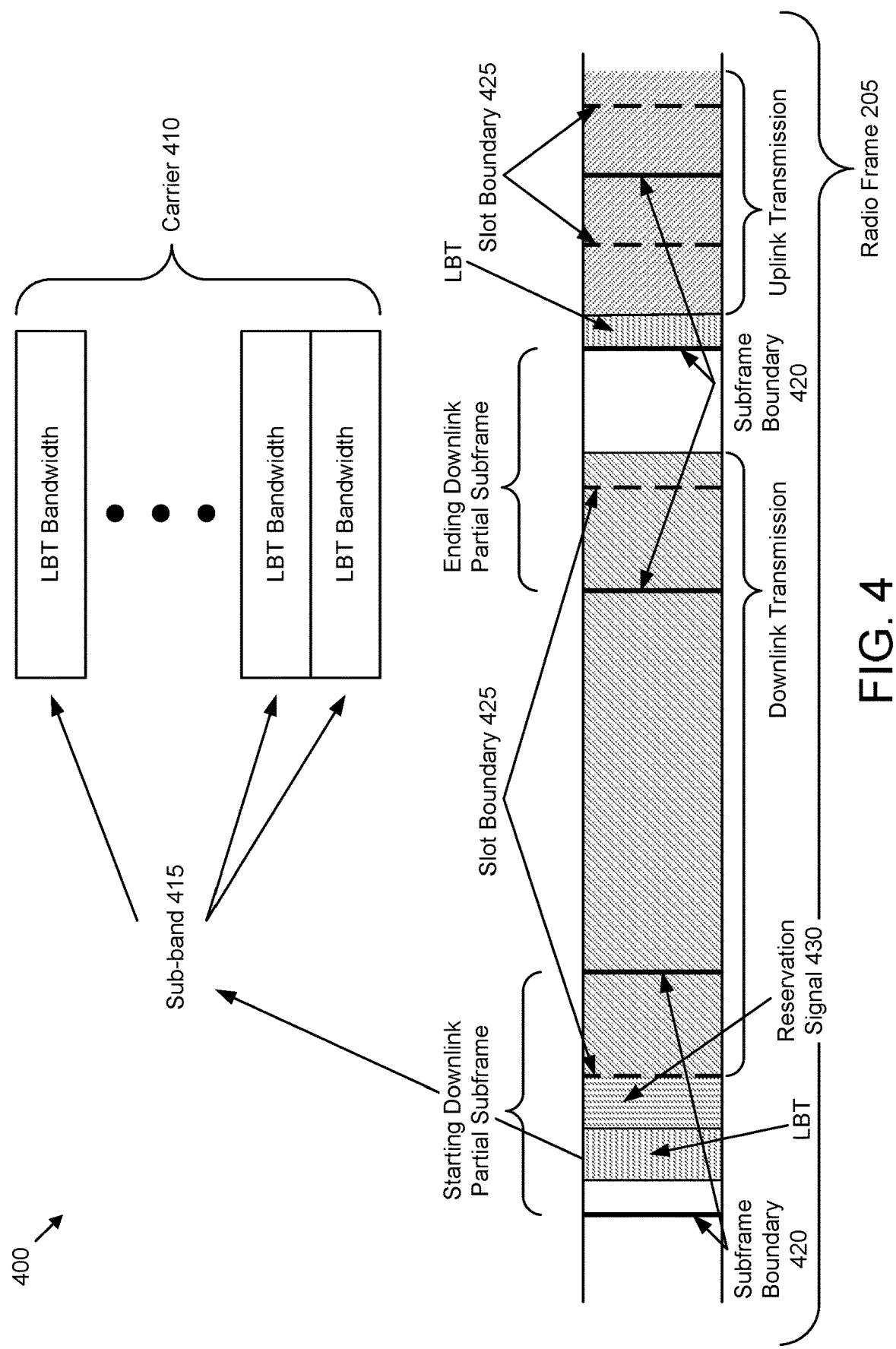
FIG. 4 is a diagram illustrating one embodiment of radio frame used to perform LBT.

FIG. 4 depicts an LBT procedure 400 for a radio frame 405 for unlicensed communication, according to embodiments of the disclosure. When a communication channel is a wide bandwidth unlicensed carrier 410 (e.g., several hundred MHz, the CCA/LBT procedure relies on detecting the energy level on multiple sub-bands 415 of the communications channel as shown in FIG. 4. The LBT parameters (such as type/duration, clear channel assessment parameters, etc.) are configured in the UE 205 by the RAN node 210.

FIG. 4 also depicts frame structure of the radio frame 405 for unlicensed communication between the UE 205 and RAN node 210. The radio frame 405 may be divided into subframes (indicated by subframe boundaries 420) and may be further divided into slots (indicated by slot boundaries 425). The radio frame 405 uses a flexible arrangements where uplink and downlink operations are on the same frequency channel but are separated in time. However, the subframes are not configured as a downlink subframe or an uplink subframe and a particular subframe may be used by either the UE 205 or RAN node 210. As discussed previously, LBT is performed prior to a transmission. Where LBT does not coincide with a slot boundary 425, a reservation signal 430 may be transmitted to reserve the channel until the slot boundary is reached and data transmission begins.

According to the third solution, the Rx panel/beam used by a UE 205 for the LBT procedure may be different from the Rx panel/beam used for DL data/control reception. According to one exemplary implementation of this solution, the Rx panel/beam used for LBT procedure is determined by the Tx panel/beam information associated with the corresponding UL transmission for which LBT procedure is performed. For example, the UE 205 uses the panel/beam information carried in a DCI (UL grant), e.g., SRI, for setting the Rx panel/beam for the corresponding LBT procedure/CCA. In other words, the Rx Panel/beam used for CCA/LBT and the Tx panel/beam used for corresponding UL transmission is to have the same spatial characteristics.

According to one implementation of this solution, the reference signal for defining the Rx panel/beam (spatial filter) used for CCA/LBT is an SRS resource, e.g., indicated by the SRI in the DCI. It should be noted that a panel/beam indication is a reference to a previously transmitted/configured reference signal in the form of a spatial QCL relation. The UE 205 is to apply the same spatial characteristics for reception (for CCA/LBT) as used for the SRS indicated by the SRI for the corresponding UL transmission.

According to another implementation of this solution, there is a mapping configured between an SRI, e.g., signaled within a DCI (UL grant), and a TCI used for Rx panel/beam on which CCA/LBT is done. Downlink beam indication is performed by signaling a so-called transmission configuration indicator (TCI) to the UE 205 which provides a spatial QCL reference that the UE 205 can use to set its Rx panel/beam. The UE 205 is configured with a list of TCI states by higher layer signaling, where each TCI state is configured with a set of CSI-RS or SSB IDs. In each state, one CSI-RS or SSB ID that is to be used as a spatial QCL reference is selected. By introducing the mapping between an SRI (state) and TCI (state), the network can control which Rx panel/beam the UE 205 uses for CCA/LBT procedure. In other words, the mapping allows network to configure which CSI-RS or SSB ID a UE 205 uses as a QCL reference for the CCA/LBT procedure.

In one embodiment, the third solution may be implemented by defining the MAC entity behavior to include the following for situations when LBT failure indication has been received from lower layers and LBT_COUNTER>=lbt-FailureInstanceMaxCount.

When consistent LBT failure has not been declared in all UL BWPs configured with PRACH occasions in a serving cell that is the SpCell, then for each activated Serving Cell configured with lbt-FailureRecoveryConfig, the MAC entity is to perform BWP deactivation for the active UL BWP, switch the active UL BWP to an UL BWP, in this Serving Cell, configured with PRACH occasion and for which consistent LBT failure has not been declared, perform the BWP activation for the selected UL BWP. Note that in performing the BWP switching operation, the DL BWP may also be switched, if needed.

According to the fourth solution, the UE 205 is allowed to autonomously change the Tx panel/beam (spatial filter) for a configured grant PUSCH. For this solution, it is assumed that for a Configured Grant type-2 the activation PDCCH carries Tx panel/beam information, e.g., SRI. In case of a Configured Grant type-1 the Tx panel/beam to be used for the CG PUSCH transmission is configured by higher layer signaling, e.g., RRC signaling.

Because the validity period of a Configured Grant can be quite long (e.g., several seconds), it may be necessary to update the spatial filter (Tx panel/beam) for the CG PUSCH transmissions, e.g., due to the UE 205's mobility. According to one implementation of the fourth solution, the UE 205 may update its transmission beam characteristics, i.e., Tx panel/beam, based on the quality of CSI-RS/SSB. For example, the UE 205 may update the beam characteristics to the one providing the highest CSI-RS/SSB SINR.

According to one further implementation of the fourth solution, the UE 205 may inform the RAN node 210 about the current used Tx panel/beam. Reporting the current used Tx panel/beam, e.g., the UE 205 might report only a change of the Tx panel/beam, allows the RAN node 210 to take this information into account for future scheduling. In one specific implementation of the fourth solution, for cases when the Configured grant PUSCH is transmitted on an unlicensed cell, the UE 205 includes information on the current used Tx panel/beam in the AUL-UCI or CG-UCI. In another implementation of the fourth solution, the UE 205 reports the Tx panel/beam information within a MAC control element.

As one different embodiment, a set of current panels/beams is used. Besides this, the network (e.g., RAN node 210) configures a candidate set of Panel(s)/Beam(s), based on the UE 205 capability. The UE 205 performs CCA/LBT and/or CSI-RS/SSB measurements on the candidate set. The measurements are reported to the RAN node 210 and this may lead the RAN node 210 configuring the UE 205 with an updated set of current panels/beams. Alternatively, the UE 205 may autonomously update its set of current panels/beams and inform the network (e.g., as described previously).

According to the fifth solution, the UE 205 applies SRI information received within a dynamic UL grant not only for the corresponding dynamic PUSCH transmission but also for subsequent configured grant PUSCH transmission(s) configured for the same cell. According to this solution RAN node 210 is able to update/steer Tx panels/beams for all subsequent scheduled UL transmissions, e.g., on PUSCH, by means of a single DCI. Since RAN node 210 does not need to send additional specific PDCCH(s) for configured grant(s), e.g., PDCCH addressed to CS-RNTI, in order to change the Tx panel/beam for CG PUSCH transmissions, signaling overhead can be reduced with this solution.

In one specific implementation of this solution a DCI, i.e., UL grant, contains explicit information, whether SRI information is also to be applied for configured grant(s).

FIG. 5 depicts a table 500 including fields for AUL-UCI. Note that the AUL-UCI includes a Channel Occupancy Time ("COT") sharing indication field. According to the sixth solution, whenever the UE 205 is sharing its COT with the RAN node 210 (or other nodes), e.g., the UE 205 indicates within the CG/AUL-UCI the COT sharing information, the UE 205 signals information on the spatial filter (Rx panel/beam) used for the CCA/LBT procedure. Such information can be used by the RAN node 210 for subsequent DL transmissions within the shared COT.

For the sixth solution, it is assumed that the RAN node 210 performs an DL transmission with the same spatial characteristics, e.g., same/similar spatial filter, as the ones used for performing LBT on a Rx panel/beam. Thus, the UE 205 performs LBT for a specific spatial direction and then the RAN node 210 performs DL transmission(s) within the COT acquired by the UE 205 in an opposite spatial direction.

In one exemplary implementation of this solution, the UE 205 signals the UE 205 Rx panel/beam information to the RAN node 210 within the AUL-UCI. Such information may be comprised of TCI state information.

According to the seventh solution, the UE 205 is not allowed to switch the Tx panel/beam during a COT. The UE 205 is to use the same spatial filter for the UL transmission during a COT as used for the CCA/LBT procedure. In case the UE 205 changes its UL panel/beam during a COT, the UE 205 performs CCA/LBT before transmitting on the uplink with a different UL Tx panel/beam.

Figure 6:
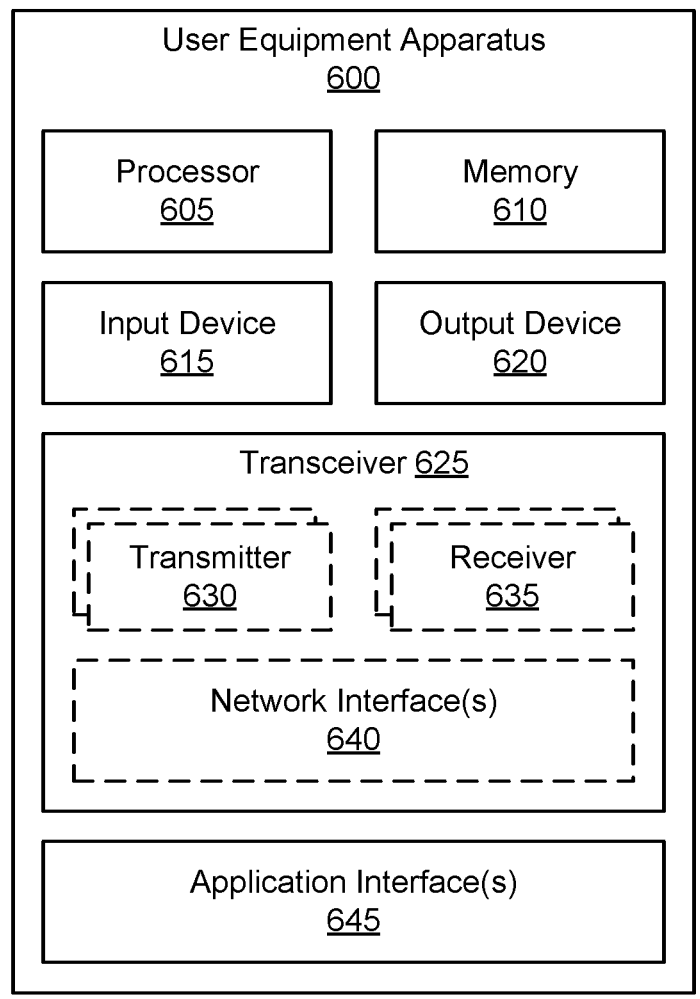
FIG. 6 is a diagram illustrating one embodiment of a user equipment apparatus that may be used for handling LBT failure for a set of panels/beams.

FIG. 6 depicts a user equipment apparatus 600 that may be used for handling LBT failure for a set of panels/beams, according to embodiments of the disclosure. In various embodiments, the user equipment apparatus 600 is used to implement one or more of the solutions described above. The user equipment apparatus 600 may be one embodiment of the remote unit 105 and/or the UE 205, described above. Furthermore, the user equipment apparatus 600 may include a processor 605, a memory 610, an input device 615, an output device 620, and a transceiver 625.

In some embodiments, the input device 615 and the output device 620 are combined into a single device, such as a touchscreen. In certain embodiments, the user equipment apparatus 600 may not include any input device 615 and/or output device 620. In various embodiments, the user equipment apparatus 600 may include one or more of: the processor 605, the memory 610, and the transceiver 625, and may not include the input device 615 and/or the output device 620.

As depicted, the transceiver 625 includes at least one transmitter 630 and at least one receiver 635. Here, the transceiver 625 communicates with one or more cells supported by one or more base units 121, including a PCell and/or PSCell, and optionally one or more SCells. Additionally, the transceiver 625 may support at least one network interface 640 and/or application interface 645. The application interface(s) 645 may support one or more APIs. The network interface(s) 640 may support 3GPP reference points, such as Uu and PC5. Other network interfaces 640 may be supported, as understood by one of ordinary skill in the art.

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the processor 605 controls the user equipment apparatus 600 to implement the above described UE behaviors. For example, via the transceiver 625, the processor 605 performs a LBT procedure for a configured set of UE Tx panels corresponding to an UL transmission. The processor 605 declares LBT failure for the UL transmission in response to determining that the LBT procedure has failed for all UE Tx panels in the configured set. Additionally, the processor 605 increments a LBT failure counter in response to LBT failure for the UL transmission. Note that while the user equipment apparatus is described in terms of performing a LBT procedure for a "set of UE panels," in other embodiments LBT may be performed for a "set of beams." As used herein, the term "panel/beam" (or similar notation) indicates that the description applies to a UE panel and/or beam.

In some embodiments, the processor 605 performs the LBT procedure for the configured set of panels/beams by concurrently performing multiple LBT procedures (i.e., performing LBT on the set of panels/beams in parallel). In other embodiments, the processor 605 performs the LBT procedure for the configured set of panels/beams by sequentially performing multiple LBT procedures (i.e., performing LBT on the set of panels/beams in TDM fashion).

In some embodiments, the processor 605 tracks a per-panel/beam LBT failure for each panel/beam in the configured set. In such embodiments, the processor 605 performs autonomous deactivation (i.e., UE-initiated deactivation) of a first panel/beam of the configured set in response to a first per-panel/beam LBT failure counter associated with the first panel/beam exceeding a threshold value.

In certain embodiments, the processor 605 activates a second panel/beam in response to deactivating the first panel/beam and performs a random-access procedure (i.e., RACH procedure) using the second panel/beam. In certain embodiments, the UL transmission corresponds to a configured grant. In some embodiments, the processor 605 controls the transceiver 625 to report LBT failure statistics to a RAN node, where the LBT failure statistics comprise per-panel/beam LBT failures for the configured set of panels/beams.

In some embodiments, the processor 605 organizes the panels/beams into at least one group of panels/beams, where all panels/beams in the group have the same QCL relationship. In such embodiments, the processor 605 tracks a per-panel/beam LBT failure counter for each group, where the per-panel/beam LBT failure counter for a group is incremented only when all panels/beams in the group experience LBT failure.

In some embodiments, the processor 605 performs the LBT procedure using a first receive Rx panel/beam corresponding to a first panel/beam of the configured set and further uses a second Rx panel/beam for downlink reception, where the first Rx panel/beam is different than the second Rx panel/beam. In certain embodiments, the processor 605 selects the first Rx panel/beam based on an SRI included in an uplink grant for the UL transmission.

In some embodiments, declaring LBT failure for the UL transmission includes a physical layer entity of the user equipment apparatus 600 sending a LBT failure indication to a MAC entity of the user equipment apparatus 600, wherein the MAC entity increments the LBT failure counter.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to handling LBT failure for a set of panels/beams. For example, the memory 610 may store panel/beam configurations, resource configurations, and the like. In certain embodiments, the memory 610 also stores program code and related data, such as an operating system or other controller algorithms operating on the apparatus 600.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display separate from, but communicatively coupled to, the rest of the user equipment apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, the output device 620 may be located near the input device 615.

The transceiver 625 includes at least transmitter 630 and at least one receiver 635. One or more transmitters 630 may be used to provide UL communication signals to a base unit 121, such as the UL transmissions described herein. Similarly, one or more receivers 635 may be used to receive DL communication signals from the base unit 121, as described herein. Although only one transmitter 630 and one receiver 635 are illustrated, the user equipment apparatus 600 may have any suitable number of transmitters 630 and receivers 635. Further, the transmitter(s) 630 and the receiver(s) 635 may be any suitable type of transmitters and receivers. In one embodiment, the transceiver 625 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 625, transmitters 630, and receivers 635 may be implemented as physically separate components that access a shared hardware resource and/or software resource, such as for example, the network interface 640.

In various embodiments, one or more transmitters 630 and/or one or more receivers 635 may be implemented and/or integrated into a single hardware component, such as a multi-transceiver chip, a system-on-a-chip, an ASIC, or other type of hardware component. In certain embodiments, one or more transmitters 630 and/or one or more receivers 635 may be implemented and/or integrated into a multi-chip module. In some embodiments, other components such as the network interface 640 or other hardware components/circuits may be integrated with any number of transmitters 630 and/or receivers 635 into a single chip. In such embodiment, the transmitters 630 and receivers 635 may be logically configured as a transceiver 625 that uses one more common control signals or as modular transmitters 630 and receivers 635 implemented in the same hardware chip or in a multi-chip module.

Figure 7:
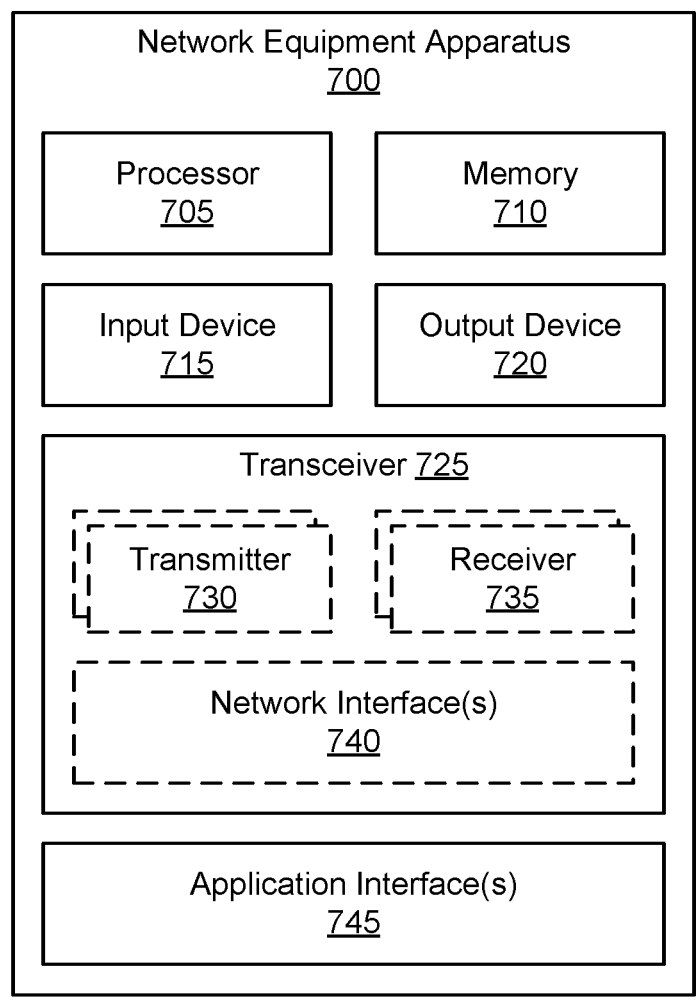
FIG. 7 is a diagram illustrating one embodiment of a network equipment apparatus that may be used for handling LBT failure for a set of panels/beams.

FIG. 7 depicts one embodiment of a network equipment apparatus 700 that may be used for handling LBT failure for a set of panels/beams, according to embodiments of the disclosure. In some embodiments, the network apparatus 700 may be one embodiment of a RAN node and its supporting hardware, such as the base unit 121, RAN node 210 and/or a gNB, described above. Furthermore, network equipment apparatus 700 may include a processor 705, a memory 710, an input device 715, an output device 720, and a transceiver 725. In certain embodiments, the network equipment apparatus 700 does not include any input device 715 and/or output device 720.

As depicted, the transceiver 725 includes at least one transmitter 730 and at least one receiver 735. Here, the transceiver 725 communicates with one or more remote units 105. Additionally, the transceiver 725 may support at least one network interface 740 and/or application interface 745. The application interface(s) 745 may support one or more APIs. The network interface(s) 740 may support 3GPP reference points, such as Uu, N1, N2 and N3. Other network interfaces 740 may be supported, as understood by one of ordinary skill in the art.

The processor 705, in one embodiment, may include any known controller capable of executing computer-readable instructions and/or capable of performing logical operations. For example, the processor 705 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725.

In various embodiments, the processor 705 controls the network equipment apparatus 700 to implement the above described RAN node behaviors. For example, the processor 705 may support one or more serving cells that serve a UE, including a PCell and/or SCell. In various embodiments, the transceiver 725 may receive a BFRQ, as described herein. Moreover, the processor 705 may allocate UL-SCH resources to a UE, as described herein.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data relating to handling LBT failure for a set of panels/beams, for example storing UE identities, panel/beam configurations, resource grants, and the like. In certain embodiments, the memory 710 also stores program code and related data, such as an operating system ("OS") or other controller algorithms operating on the network equipment apparatus 700 and one or more software applications.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, may include any known electronically controllable display or display device. The output device 720 may be designed to output visual, audible, and/or haptic signals. In some embodiments, the output device 720 includes an electronic display capable of outputting visual data to a user. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, all or portions of the output device 720 may be located near the input device 715.

As discussed above, the transceiver 725 may communicate with one or more remote units and/or with one or more network functions that provide access to one or more PLMNs. The transceiver 725 operates under the control of the processor 705 to transmit messages, data, and other signals and also to receive messages, data, and other signals. For example, the processor 705 may selectively activate the transceiver (or portions thereof) at particular times in order to send and receive messages.

The transceiver 725 may include one or more transmitters 730 and one or more receivers 735. In certain embodiments, the one or more transmitters 730 and/or the one or more receivers 735 may share transceiver hardware and/or circuitry. For example, the one or more transmitters 730 and/or the one or more receivers 735 may share antenna(s), antenna tuner(s), amplifier(s), filter(s), oscillator(s), mixer(s), modulator/demodulator(s), power supply, and the like. In one embodiment, the transceiver 725 implements multiple logical transceivers using different communication protocols or protocol stacks, while using common physical hardware.

Figure 8:
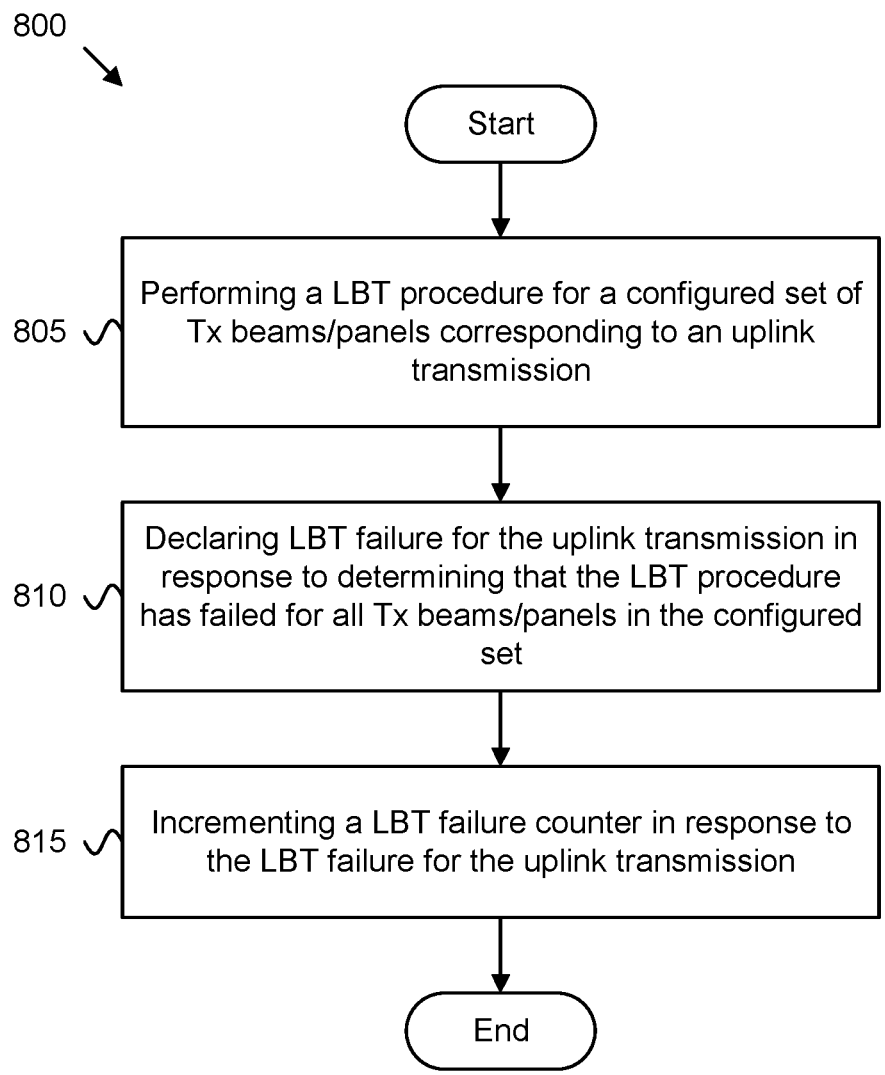
FIG. 8 is a flowchart diagram illustrating one embodiment of a method for handling LBT failure for a set of panels/beams.

FIG. 8 depicts one embodiment of a method 800 for handling LBT failure for a set of panels/beams, according to embodiments of the disclosure. In various embodiments, the method 800 is performed by a UE, such as the remote unit 105, the UE 205 and/or the user equipment apparatus 600, described above. In some embodiments, the method 800 is performed by a processor, such as a microcontroller, a microprocessor, a CPU, a GPU, an auxiliary processing unit, a FPGA, or the like.

The method 800 begins and performs 805 a LBT procedure for a configured set of Tx beams corresponding to an uplink transmission. The method 800 includes declaring 810 LBT failure for the uplink transmission in response to determining that the LBT procedure has failed for all Tx beams in the configured set. The method 800 includes incrementing 815 a LBT failure counter in response to LBT failure for the uplink transmission. The method 800 ends.

Disclosed herein is a first apparatus for handling LBT failure for a set of panels/beams, according to embodiments of the disclosure. The first apparatus may be implemented by a UE, such as the remote unit 105, the UE 205 and/or the user equipment apparatus 600, described above. The first apparatus includes a transceiver that includes a plurality of UE panels associated with one or more beams. The first apparatus includes a processor that performs a LBT procedure for a configured set of UE Tx panels corresponding to an uplink transmission. The processor declares LBT failure for the uplink transmission in response to determining that the LBT procedure has failed for all UE Tx panels in the configured set and increments a LBT failure counter in response to LBT failure for the uplink transmission. Note that while the first apparatus is described in terms of performing a LBT procedure for a "set of UE panels," in other embodiments LBT may be performed for a "set of beams."

In some embodiments, performing the LBT procedure for the configured set of UE Tx panels comprises concurrently performing multiple LBT procedures (i.e., performing LBT on the set of UE Tx panels in parallel). In other embodiments, performing the LBT procedure for the configured set of UE Tx panels comprises sequentially performing multiple LBT procedures (i.e., performing LBT on the set of UE Tx panels in TDM fashion).

In some embodiments, the processor tracks a per-panel LBT failure for each UE Tx panels in the configured set. In such embodiments, the processor performs autonomous deactivation (i.e., UE-initiated deactivation) of a first UE Tx panel of the configured set in response to a first per-panel LBT failure counter associated with the first UE Tx panel exceeding a threshold value.

In certain embodiments, the processor activates a second UE Tx panel in response to deactivating the first UE Tx panel and performs a random-access procedure using the second UE Tx panel. In certain embodiments, the uplink transmission corresponds to a configured grant. In some embodiments, the processor (e.g., via the transceiver) reports LBT failure statistics to a RAN node, where the LBT failure statistics comprise per-panel LBT failures for the configured set of UE Tx panels.

In some embodiments, the processor forms at least one group of UE Tx panels, where all UE Tx panels in the group have the same QCL relationship. In such embodiments, the processor tracks a per-panel LBT failure counter for each group, where the per-panel LBT failure counter for a group is incremented only when all UE Tx panels in the group experience LBT failure.

In some embodiments, the LBT procedure is performed using a first receive UE Rx panel corresponding to a first UE Tx panel of the configured set. In such embodiments, the processor further uses a second UE Rx panel for downlink reception, where the first UE Rx panel is different than the second UE Rx panel. In certain embodiments, the first UE Rx panel is selected based on an SRI included in an uplink grant for the uplink transmission.

In some embodiments, declaring LBT failure for the uplink transmission includes a physical layer entity of the apparatus sending a LBT failure indication to a MAC entity of the apparatus, wherein the MAC entity increments the LBT failure counter.

Disclosed herein is a first method for handling LBT failure for a set of panels/beams, according to embodiments of the disclosure. The first method may be performed by a UE, such as the remote unit 105, the UE 205 and/or the user equipment apparatus 600, described above. The first method includes performing a LBT procedure for a configured set of Tx beams corresponding to an uplink transmission. The first method includes declaring LBT failure for the uplink transmission in response to determining that the LBT procedure has failed for all Tx beams in the configured set and incrementing a LBT failure counter in response to LBT failure for the uplink transmission. Note that while the first method is described in terms of performing a LBT procedure for a "set of beams," in other embodiments LBT may be performed for a "set of UE panels."

In some embodiments, performing the LBT procedure for the configured set of Tx beams comprises concurrently performing multiple LBT procedures (i.e., performing LBT on the set of Tx beams in parallel). In other embodiments, performing the LBT procedure for the configured set of Tx beams comprises sequentially performing multiple LBT procedures (i.e., performing LBT on the set of Tx beams in TDM fashion).

In some embodiments, the first method includes tracking a per-beam LBT failure for each Tx beams in the configured set. In such embodiments, the first method may also include performing autonomous deactivation (i.e., UE-initiated deactivation) of a first Tx beam of the configured set in response to a first per-beam LBT failure counter associated with the first Tx beam exceeding a threshold value.

In certain embodiments, the first method includes activating a second Tx beam in response to deactivating the first Tx beam and performing a random-access procedure using the second Tx beam. In certain embodiments, the uplink transmission corresponds to a configured grant. In some embodiments, the first method includes reporting LBT failure statistics to a RAN node, where the LBT failure statistics comprise per-beam LBT failures for the configured set of Tx beams.

In some embodiments, the first method includes forming at least one group of Tx beams, where all Tx beams in the group have the same QCL relationship. In such embodiments, the first method includes tracking a per-beam LBT failure counter for each group, where the per-beam LBT failure counter for a group is incremented only when all Tx beams in the group experience LBT failure.

In some embodiments, the LBT procedure is performed using a first receive Rx beam corresponding to a first Tx beam of the configured set, the method further comprising using a second Rx beam for downlink reception, wherein the first Rx beam is different than the second Rx beam. In certain embodiments, the first Rx beam is selected based on an SRI included in an uplink grant for the uplink transmission.

In some embodiments, declaring LBT failure for the uplink transmission includes a physical layer entity of the UE sending a LBT failure indication to a MAC entity of the UE, wherein the MAC entity increments the LBT failure counter.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment device ("UE"), the method comprising:
   performing a listen-before-talk ("LBT") procedure for a configured set of transmit ("Tx") beams corresponding to an uplink transmission, the set of Tx beams comprising at least one group of beams having a same quasi-co-location ("QCL") relationship;

determining an LBT failure for the uplink transmission in response to determining that the LBT procedure has failed for all Tx beams in the configured set;

incrementing a first LBT failure counter in response to LBT failure for the uplink transmission;

tracking a second LBT failure counter for each group of beams in the set of Tx beams; and incrementing the second LBT failure counter in response to all Tx beams in a respective group of beams experiencing LBT failure.

2. The method of claim 1, wherein performing the LBT procedure for the configured set of Tx beams comprises concurrently performing multiple LBT procedures.

3. The method of claim 1, wherein performing the LBT procedure for the configured set of Tx beams comprises sequentially performing multiple LBT procedures.

4. The method of claim 1, further comprising tracking a per-beam LBT failure for each Tx beams in the configured set.

5. The method of claim 4, further comprising performing autonomous deactivation of a first Tx beam of the configured set in response to a first per-beam LBT failure counter associated with the first Tx beam exceeding a threshold value.

6. The method of claim 5, further comprising activating a second Tx beam in response to deactivating the first Tx beam; and performing a random-access procedure using the second Tx beam.

7. The method of claim 5, wherein the uplink transmission corresponds to a configured grant.

8. The method of claim 4, further comprising reporting LBT failure statistics to a radio access network ("RAN") node, the LBT failure statistics comprising per-beam LBT failures for the configured set of Tx beams, or per-group LBT failures for the configured set of Tx beams, or both.

9. The method of claim 1, wherein the LBT procedure is performed using a first receive ("RX") beam corresponding to a first Tx beam of the configured set, the method further comprising using a second Rx beam for downlink reception, wherein the first Rx beam is different than the second Rx beam.

10. The method of claim 9, wherein the first Rx beam is selected based on a Sounding Reference Signal Resource Indicator ("SRI") included in an uplink grant for the uplink transmission.

11. The method of claim 1, wherein declaring LBT failure for the uplink transmission comprises a physical layer entity of the UE sending a LBT failure indication to a MAC entity of the UE, wherein the MAC entity increments the first LBT failure counter or the second LBT failure counter.

12. A user equipment ("UE") for wireless communication, comprising:

a memory; and a processor coupled with the memory and configured to cause the UE to:

perform a listen-before-talk ("LBT") procedure for a configured set of transmit ("Tx") panels corresponding to an uplink transmission, wherein the set of Tx panels comprises a plurality of panels associated with one or more beams and comprises at least one group of panels having a same quasi-co-location ("QCL") relationship;

determine an LBT failure for the uplink transmission in response to determining that the LBT procedure has failed for all Tx panels in the configured set;

increment a first LBT failure counter in response to LBT failure for the uplink transmission;

track a second LBT failure counter for each group of panels in the set of Tx panels; and increment the second LBT failure counter in response to all Tx panels in a respective group of panels experiencing LBT failure.

13. The UE of claim 12, wherein the processor is configured to cause the UE to track a per-panel LBT failure for each Tx panels in the configured set.

14. The UE of claim 13, wherein the processor is configured to cause the UE to perform autonomous deactivation of a first Tx panel of the configured set in response to a first per-panel LBT failure counter associated with the first Tx panel exceeding a threshold value.

15. The UE of claim 14, wherein the processor is configured to cause the UE to:

activate a second UE-Tx panel in response to deactivating the first Tx panel; and perform a random-access procedure using the second Tx panel.

16. The UE of claim 13, wherein the processor is configured to cause the UE to report LBT failure statistics to a radio access network ("RAN") node, the LBT failure statistics comprising per-panel LBT failures for the configured set of Tx panels, or per-group LBT failures for the configured set of Tx panels, or both.

17. The UE of claim 12, wherein the processor is configured to cause the UE to:

perform the LBT procedure using a first UE receive ("RX") panel corresponding to a first Tx panel of the configured set, and use a second UE Rx panel for downlink reception, wherein the first UE Rx panel is different than the second UE Rx panel.

18. The UE of claim 17, wherein the first UE Rx panel is selected based on a Sounding Reference Signal Resource Indicator ("SRI") included in an uplink grant for the uplink transmission.

19. The UE of claim 12, wherein to declare LBT failure for the uplink transmission, a physical layer entity of the UE sends a LBT failure indication to a MAC entity of the UE, wherein the MAC entity increments the first LBT failure counter or the second LBT failure counter.

\* \* \* \* \*